March 9, 1943.  T. M. LEKA  2,313,447
AIRCRAFT
Filed June 17, 1940  3 Sheets-Sheet 1

INVENTOR.
THOMAS M. LEKA
BY
Clark + Ott
ATTORNEYS

March 9, 1943. T. M. LEKA 2,313,447
AIRCRAFT
Filed June 17, 1940 3 Sheets-Sheet 2
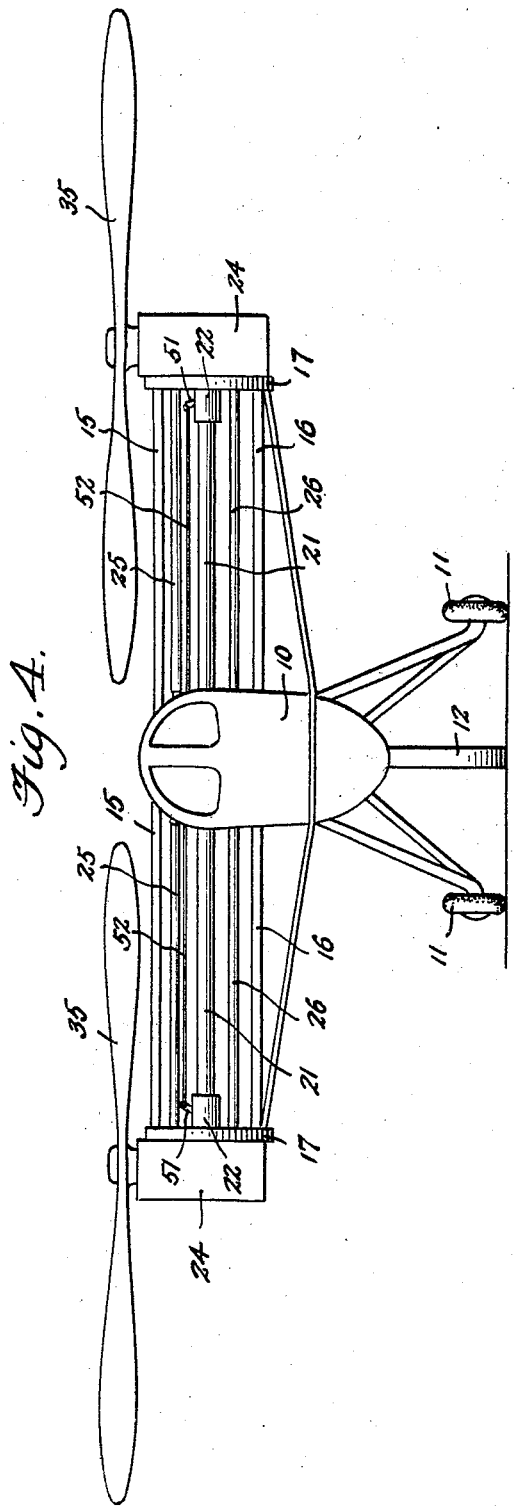
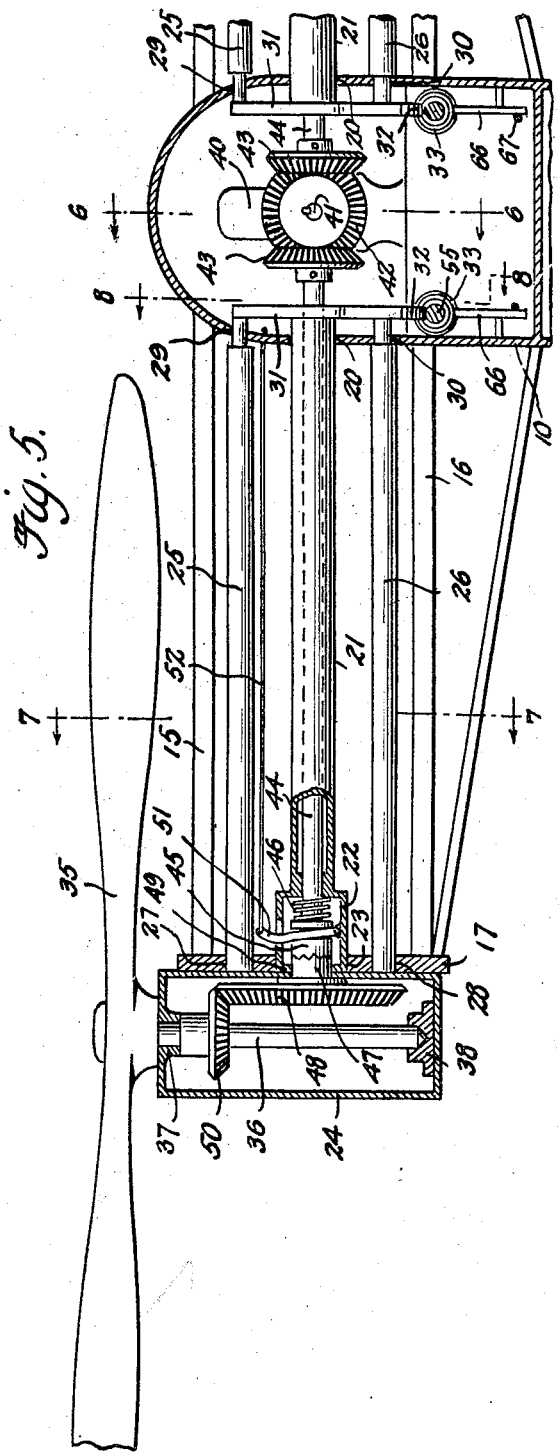
INVENTOR.
THOMAS M. LEKA
BY
Clark + Ott
ATTORNEYS March 9, 1943.  T. M. LEKA  2,313,447
AIRCRAFT
Filed June 17, 1940  3 Sheets-Sheet 3

INVENTOR.
THOMAS M. LEKA
BY Clark & Ott
ATTORNEYS

Patented Mar. 9, 1943

2,313,447

UNITED STATES PATENT OFFICE 2,313,447

AIRCRAFT

Thomas M. Leka, Hackensack, N. J.

Application June 17, 1940, Serial No. 340,966

2 Claims. (Cl. 244—17)

This invention relates to air craft and is directed to certain improvements in craft of the heavier-than-air type which operate on the helicopter principle.

It is the principal object of the present invention to provide an air craft which is designed for general use by the public and in which speed is materially sacrificed in favor of safety and whereby launching and landing of the craft may be effected on fields of comparatively small areas.

More particularly the invention resides in an improved air craft of the indicated character in which the lift and sustaining forces are derived from motor driven helicopter propellers which are mounted for shifting movement of their axes from a vertical position when effecting a direct lift to a forward inclination for propelling the craft forwardly and for sustaining the same in the air.

As a further feature the invention resides in the mounting of the helicopter blades for pitching of the axes thereof at a rearward inclination during the lowering and landing of the craft to reduce the forward rolling movement of the plane to a minimum after landing.

The invention further comprehends in an air craft of the character set forth, a pair of laterally spaced helicopter propellers having clutch means for effecting the coupling and uncoupling of the same with the motor whereby in event of motor failure the helicopter propellers may be disconnected to function as means for controlling the descent during a forced landing.

The invention also embodies means actuated by the motor and controlled by the operator for effecting the shifting of the axial position of the helicopter propellers to the various positions required in launching, landing and propelling and sustaining the craft when in the air.

With the above enumerated and other objects in view, the invention is set forth in greater detail in the following specification and illustrated in the accompanying drawings, in which:

Fig. 4 is an enlarged front elevation of the craft.

Fig. 5 is an enlarged fragmentary transverse sectional view therethrough.

Figure 1:
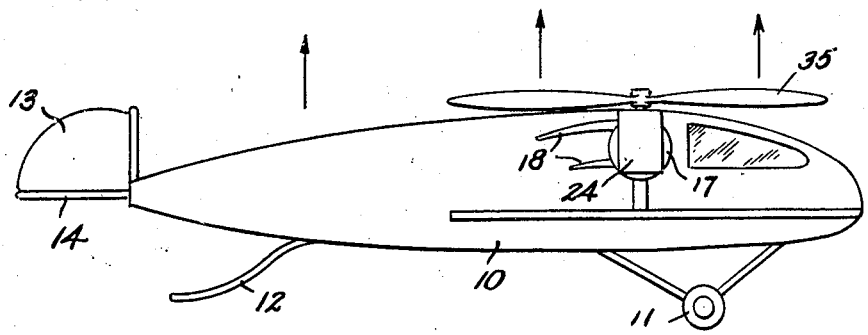
Fig. 1 is a diagrammatic side view illustrating the position of the propellers when launching the craft.
Figure 2:
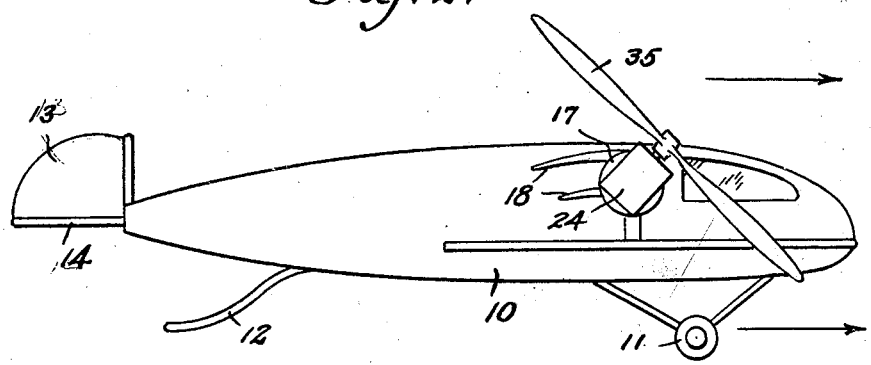
Fig. 2 is a similar view illustrating the position of the propellers when the craft is being propelled in the air.
Figure 3:
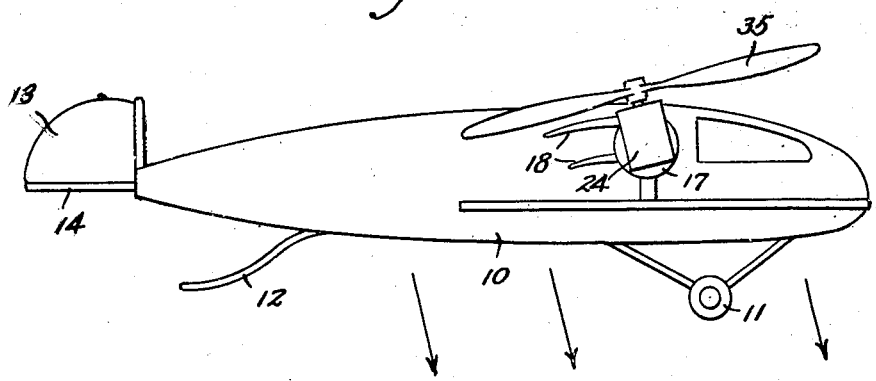
Fig. 3 is a similar view illustrating the position of the propellers when landing the craft.
Figure 6:
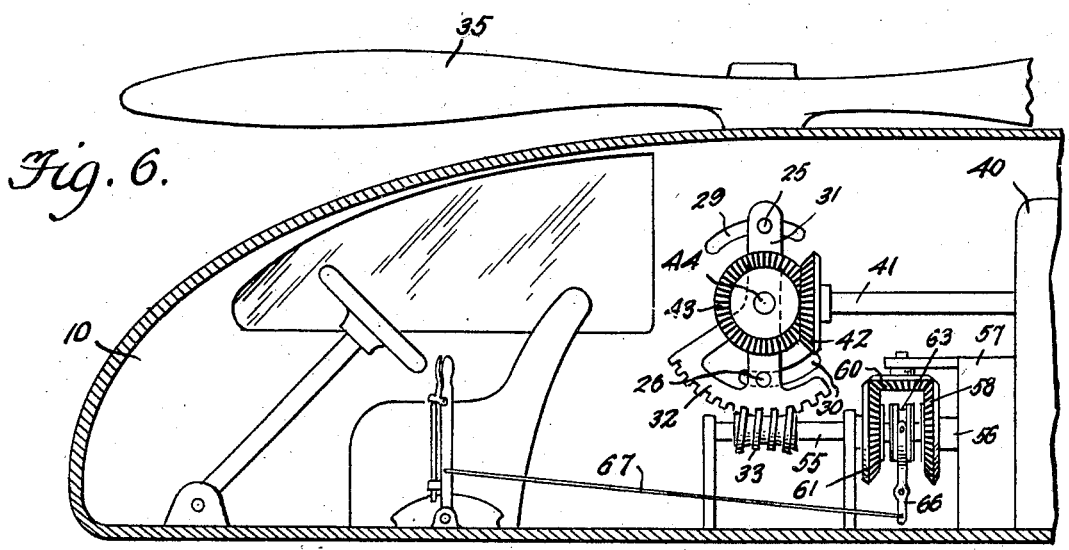
Fig. 6 is an enlarged longitudinal sectional view taken approximately on the line 6—6 of Fig. 5.
Figure 7:
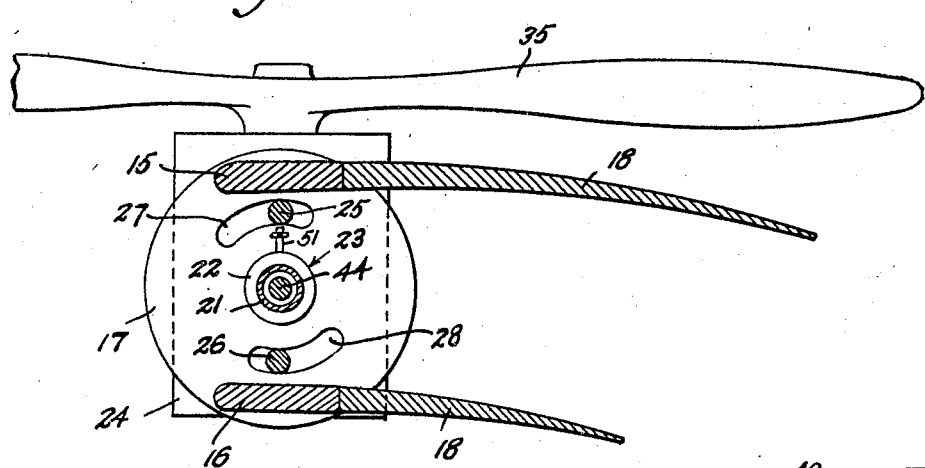
Fig. 7 is an enlarged sectional view taken approximately on the line 7—7 of Fig. 5.
Figure 8:
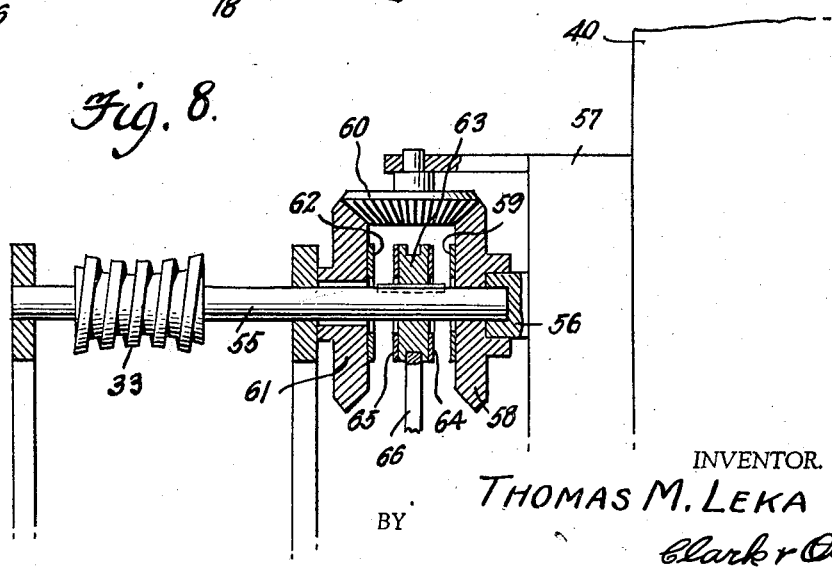
Fig. 8 is an enlarged fragmentary sectional view taken approximately on the line 8—8 of Fig. 5.

Referring to the drawings by characters of reference, 10 designates the body or fuselage of the air craft which may be of any approved form or type and which as here illustrated includes a landing gear consisting of forward wheels 11 and a rear skid 12. The craft is also provided with the usual rudder 13 and elevator 14 for controlling the turning and elevation and descent of the craft when in flight.

The body or fuselage 10 is provided on opposite sides thereof with laterally projecting frames defined by the upper and lower members 15 and 16 connected by outer bearing heads 17, and said frames may preferably carry relatively small air foils or wing sections 18. Extending laterally outward from opposite sides of the fuselage 10 through bearing openings 20 are a pair of torque tubes 21 each having an enlarged outer end 22 which is journaled in a bearing opening 23 in the bearing plate 17. The enlarged outer end 22 is secured to a gear box or housing 24 and a pair of parallel upper and lower connecting rods 25 and 26 are also secured to the gear box or housing 24 and extend therefrom inwardly towards the fuselage through arcuate slots 27 and 28 in the bearing plate 17. The inner ends of the connecting rods 25 and 26 extend through arcuate slots 29 and 30 in the fuselage and the inner terminals are anchored to a casting 31 which is provided with a worm segment 32 engaged by a worm 33 by means of which the torque tube 21 may be turned in opposite directions to swing the gear box or housing 24.

A helicopter propeller 35 is secured to a depending shaft 36 which extends downwardly into the gear box or housing 24 and is journaled for rotation in bearings 37 and 38 provided in the gear box.

A motor 40 within the fuselage is provided with a forwardly extending drive shaft 41 which has keyed thereto a beveled gear 42. Beveled pinions 43 mesh with the beveled gear 42 and are secured to shafts 44 which protrude outwardly in diametrically opposite directions respectively through the torque tubes 21 at the opposite sides of the fuselage. The outer end of each shaft 44 extends into the enlarged outer end portion 22 of the torque tube and has splined thereon for sliding movement a clutch element 45 which is normally urged outwardly by a spring 46 to engage with a complementary clutch element 47 secured to a bevel gear 48 which is journaled for rotation in a bearing 49 at the juncture of the enlarged outer end 22 of the torque tube with the gear box or housing 24. The bevel gear 48 which is located within the housing or gear box 24 meshes with a bevel pinion 50 keyed to the depending shaft 36 of the helicopter propeller 35. The clutch element 45 is controlled by a shifting lever 51 which has connected therewith a pull cable 52 extending into the fuselage and within reach of the operator by means of which the clutch element 45 may be retracted to disconnect the shaft 44 from the bevel gear 48 and thereby uncouple the helicopter propellers 35 from the motor.

The worm 33 which engages the segment 32 is secured to a shaft section 55 which extends rearwardly therefrom in axial alignment with and has bearing in the forward end of a shaft section 56 which is connected to and driven by the motor 40 through a reducing gearing in a gearing box 57. The shaft 56 has secured thereto a beveled gear 58 having a clutch face 59 and said beveled gear 58 meshes with a beveled pinion 60 which in turn meshes with a beveled gear 61 having a clutch face 62. The beveled gear 61 and its clutch face 62 are driven in a reverse direction to the beveled gear 58 and the worm shaft 55 extends axially and loosely through the beveled gear 61.

The worm shaft 55 is provided intermediate the opposed clutch faces 59 and 62 with a clutch element 63 having opposite clutch faces 64 and 65 and the clutch element is splined to turn with and slide on the worm shaft 55. The clutch element is shiftable by means of a shifting fork 66 connected with a forwardly extending control rod 67 disposed within reach of the operator for selectively driving the worm gear in opposite directions to effect the movement of the segment 32 and the casting 31 to turn the gear boxes 24 so as to dispose the helicopter propellers for rotation on a vertical axis or at forward or rearward inclinations.

In use and operation it is apparent that when the aircraft is to be launched, the helicopter propellers 35 are disposed for rotation on a vertical axis as illustrated in Fig. 1 to effect a direct upward lift of the craft. After the craft is propelled to the desired elevation, the operator shifts the clutch element 62 to cause the gear boxes 24 to turn to a forward inclination to effect a forward movement of the craft while the propellers rotating on a forwardly inclined axis will also sustain the same in the air as the traction force is exerted forwardly and rearwardly. When it is desired to land the craft, the operator shifts the clutch element 62 to effect turning movement of the gear boxes 24 rearwardly until the axes of rotation of the propellers are inclined slightly rearward during the lowering and landing of the craft so as to minimize the forward rolling movement after contact with the ground.

What is claimed is:

1. In an air craft, a fuselage, lateral oppositely projecting fixed frames carried thereby, a bearing head fixedly secured to the outer end of each frame, a motor carried by the fuselage, a drive shaft operatively connected with the motor and extending laterally outward through each frame and bearing head, a gear box mounted to turn with reference to the bearing head on an axis coinciding with the axis of the drive shaft, a helicopter propeller having a depending shaft extending into each gear box, meshing beveled gears located in each gear box and respectively secured to the propeller and drive shafts for driving the propellers, a torque tube connected with each gear box through which the drive shafts respectively extend, said torque tubes being respectively journaled in the fuselage and in the bearing heads, friction clutch means within the control of the operator for operatively connecting the torque tubes with the motor to simultaneously turn the gear boxes so as to dispose the axes of the propellers vertically or at a forward or rearward inclination, and means for limiting the turning of the gear boxes so as to dispose the axes of rotation of the propellers at predetermined forwardly and rearwardly inclined positions consisting of arcuately slotted portions on opposite sides of the fuselage and a pair of connecting rods disposed parallel with and on opposite sides of each torque tube extending through said slotted portions and respectively secured at the opposite ends thereof to the gear box and the inner end of the torque tube for engagement with the opposite ends of the slotted portions.

2. In an air craft, a fuselage having in each of the opposite sides thereof a bearing opening and a pair of concentric arcuate slots, a motor carried by the fuselage, fixed frames projecting laterally outward from opposite sides of the fuselage, a bearing head secured to the outer end of each frame and having a central bearing opening and a pair of concentric arcuate slots disposed in alignment with the corresponding fuselage bearing openings and slots, a torque tube extending longitudinally of each frame and journaled respectively in the bearing openings of the fuselage and bearing head, a gear box secured to the outer end of each torque tube having bearing engagement with the outer surfaces of the bearing heads, a drive shaft extending through each gear box and torque tube and having driving connection at the inner end thereof with the motor, a helicopter propeller having a depending shaft extending downwardly into each gear box, meshing gears in the gear box connected respectively to the propeller and drive shafts, a gear segment secured to the inner end of each torque tube and located within the fuselage, a pair of connecting rods secured respectively at the opposite ends to each gear box and gear segment and extending through said pairs of concentric arcuate slots in the bearing head and sides of the fuselage, and a worm gear meshing with each gear segment and adapted to be operatively connected with the motor for turning the gear boxes so as to dispose the axes of the propeller shafts respectively vertical and at forward or rearward inclinations, the connecting rods being adapted to engage with opposite ends of the arcuate slots to limit the disposal of the same at predetermined forward and rearward inclinations.

THOMAS M. LEKA.